8870X
Bean & Skinner,
Fire Place.
Patented June 12. 1835.
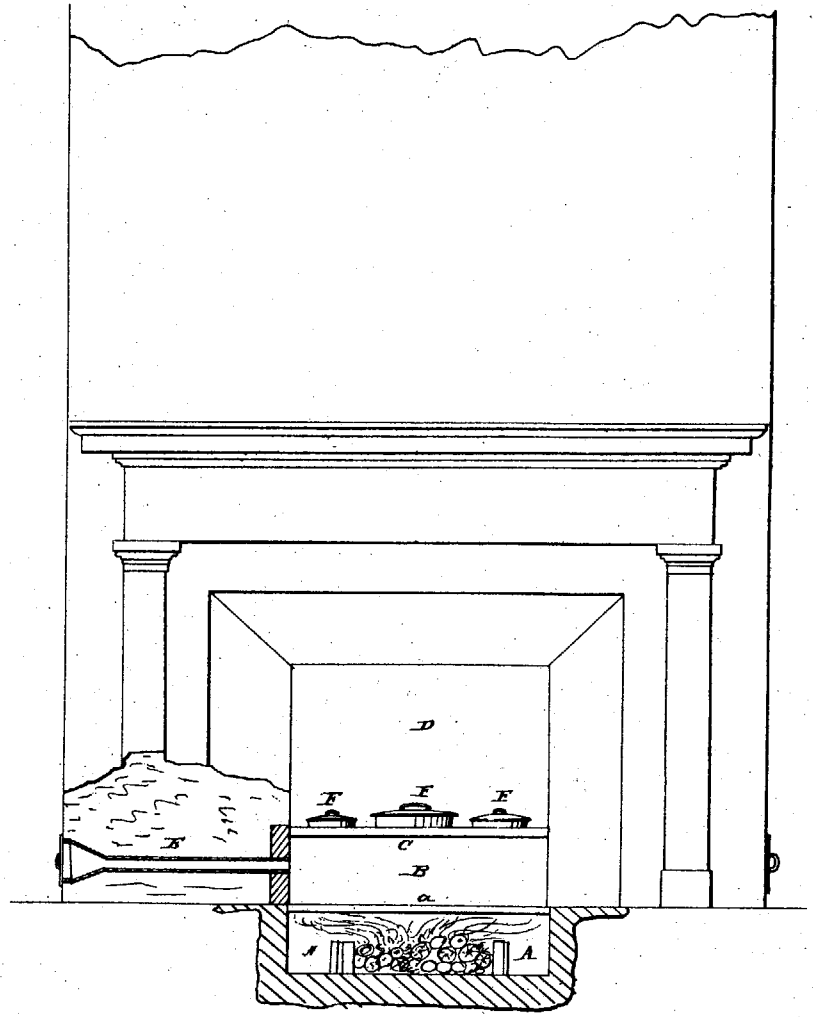
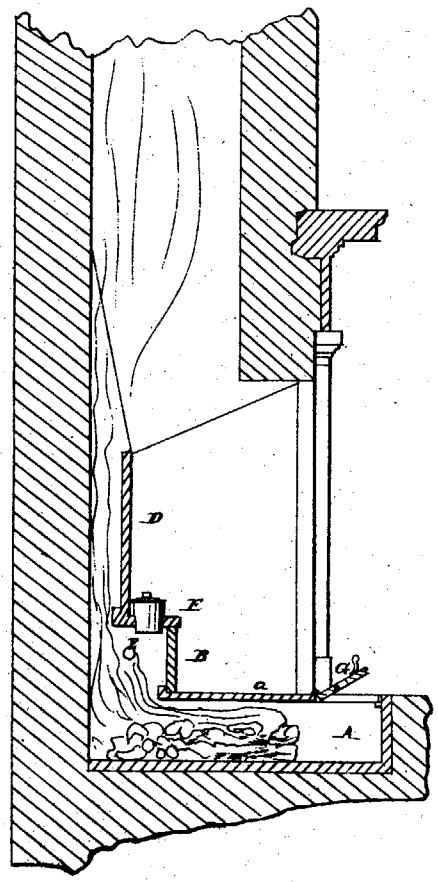

8870X June 12 1835

Ira A. Bean and Elijah Skinners Fire Place.
Letters Patent.

The Schedule referred to in these Letters Patent and making part of the same
containing a description in the words of the said Ira A Bean and Elijah Skinner
themselves of their improvement in the common fire place

---

To all to whom these Presents shall come
Be it known that we Ira A Bean and Elijah Skinner of Sandwich in the
County of Strafford and State of New Hampshire have invented a new & use
ful improvement in the common fire place and that the following is a full
and exact description of the construction of said improvement as invented by us. In the hearth
of a common fire place we make a box of Mason work or cast iron about eight
inches deep, and equal in length to the width of the back of the fire place and
extending outward from the back eight inches further than the jambs or Coving)
We then cover this box in part with a horizontal cast iron plate made level
with the top of the hearth, with a ledge on the back upper edge, and extending
inward so far as to leave an open space between this and the back of the fire
place sufficient to receive the false back herein after described. We then at
tach to the top of the back edge of this cover a perpendicular cast iron
plate about eight or ten inches high and upon the top of this we place horizon-
tally another cast iron plate with a ledge upon the back upper edge, and)
wide enough to cover the whole opening left for the false back except a suffi-
cient place for a flue in the back of the fire place. And in this cover or
plate we make openings to receive boilers of different sizes with covers to the
openings as in cooking stoves. We then place perpendicularly upon the back
edge of the cover of the false back a plate of sheet or cast iron extending up-
ward far enough and at a proper distance from the back of the fire place
to form a sufficient flue to conduct the smoke into the throat of the Chimney).
We then make the ends of the false back of mason work or cast iron so as to make
a neat finish for an open fire place, and when we wish to use it as such, we
extend the front of the false back upward, if necessary by a plate of sheet iron
any required height. We also make in the cover of the box in the hearth a door

8870X near the front to receive the fuel, with a small appeture in the door to
give the necessary draught. We have a small cast iron flue leading from
one or both ends of the box, (and out through the hearth at or near the corner
of the jambs, so constructed as to receive funnels to convey the heat more di
rectly into to the room when necessary), (and in the flue in the back aforesaid
(and in the funnels we have dampers to regulate the heat; We use the box in
the hearth, (and the flues (and funnels without any false back) if we choose
so to do, or we use the false back with the back flue, without the fun
nels or box in the hearth in which case we have an opening) in the front of
the false back to put in the fuel What we claim as new (and our invention or
improvement) is the construction of the box in the hearth, and the arrange-
ment (and application of the same with the flues, funnels (and false back, to
common open fire places. The object of which is to save room (and fuel,
furnish a cheap (and convenient apparatus for cooking (and at the same
_ avoid the impure air, occasioned by) close stoves, and the steam from
cooking stoves. Sandwich Nov 1. 1834.

Exd. Witnesses
[illegible] Daniel Hoit
Saml Ambrose

Ira A. Bean
Elijah Skinner

[illegible] Mode

[illegible]